United States Patent
Williams et al.

(10) Patent No.: US 9,980,192 B2
(45) Date of Patent: May 22, 2018

(54) TRAFFIC STEERING BETWEEN WLAN AND CELLULAR NETWORKS

(71) Applicant: Telefonaktiebolaget L M Ericsson (publ), Stockholm (SE)

(72) Inventors: Christopher Williams, Nepean (CA);
Aroosh Elahi, Gloucester (CA);
Evangelos Paravalos, Kanata (CA);
Stephen Rayment, Ottawa (CA)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days. days.

(21) Appl. No.: 14/419,814

(22) PCT Filed: Oct. 10, 2014

(86) PCT No.: PCT/IB2014/065219
§ 371 (c)(1),
(2) Date: Feb. 5, 2015

(87) PCT Pub. No.: WO2015/124967
PCT Pub. Date: Aug. 27, 2015

(65) Prior Publication Data
US 2015/0245268 A1    Aug. 27, 2015

Related U.S. Application Data

(60) Provisional application No. 61/943,071, filed on Feb. 21, 2014.

(51) Int. Cl.
*H04W 36/22* (2009.01)
*H04W 36/18* (2009.01)
(Continued)

(52) U.S. Cl.
CPC ........... *H04W 36/22* (2013.01); *H04W 36/08* (2013.01); *H04W 36/14* (2013.01); *H04W 36/18* (2013.01);
(Continued)

(58) Field of Classification Search
None
See application file for complete search history.

(56) References Cited

U.S. PATENT DOCUMENTS 6,690,939 B1    2/2004  Jonsson et al.
8,611,900 B2   12/2013  Pandit et al.
(Continued)

FOREIGN PATENT DOCUMENTS

EP    1511224 A2    3/2005
EP    2688339 A2    1/2014
(Continued)

OTHER PUBLICATIONS

The Institute of Electricaland Electronics Engineers, Inc., "IEEE Standard for Information Technology—Telecommunication and information exchange between systems—Local and metropolitan area networks—Specific requirements. Part 11: Wireless LAN Medium Access Control (MAC) and Physical Layer (PHY) Specifications", IEEE Std 802.11, Jun. 12, 2007, pp. 1-1237, IEEE.

*Primary Examiner* — Hong Cho
(74) *Attorney, Agent, or Firm* — Coats & Bennett, PLLC

(57) ABSTRACT

A method and apparatus are disclosed for steering a UE (103) from a WLAN (105) to a cellular network (106) with an overlapping coverage area. The UE (103) is connected to the WLAN (105) through an access point (AP) (102). The AP (102) suppresses the broadcast of a network identifier of the WLAN (105) and de-authenticates the UE (103) from the WLAN (105). After de-authenticating the UE (103), the AP (102) ignores probe requests from the UE (103). The UE
(Continued)

(103) will conclude that the WLAN (105) is no longer available and will connect to the cellular network. From the perspective of the UE (103), the suppression of the network makes it appear to the UE (103) that it has moved out of range of the AP (102) so the UE (103) will not "blacklist" the WLAN (105). The suppression of the network ID will not impact UEs not targeted, which will continue to communicate via WLAN (105) even when the network ID is suppressed.

20 Claims, 7 Drawing Sheets

(51) Int. Cl.
    *H04W 48/18* (2009.01)
    *H04W 84/12* (2009.01)
    *H04W 88/06* (2009.01)
    *H04W 76/02* (2009.01)
    *H04W 36/08* (2009.01)
    *H04W 36/14* (2009.01)
    *H04W 48/06* (2009.01)

(52) U.S. Cl.
    CPC ......... *H04W 48/18* (2013.01); *H04W 76/021* (2013.01); *H04W 76/023* (2013.01); *H04W 48/06* (2013.01); *H04W 84/12* (2013.01); *H04W 88/06* (2013.01)

(56) References Cited

U.S. PATENT DOCUMENTS

| | | | |
|---|---|---|---|
| 8,718,644 B2 | 5/2014 | Thomas et al. | |
| 8,725,144 B2 | 5/2014 | Islam et al. | |
| 9,113,400 B2* | 8/2015 | Varma | H04W 48/16 |
| 9,232,408 B2 | 1/2016 | Richards | |
| 9,549,336 B2 | 1/2017 | Kim et al. | |
| 2003/0223395 A1 | 12/2003 | Chitrapu | |
| 2004/0229621 A1 | 11/2004 | Misra | |
| 2004/0233840 A1 | 11/2004 | Bye | |
| 2005/0152320 A1 | 7/2005 | Marinier et al. | |
| 2006/0126565 A1 | 6/2006 | Shaheen | |
| 2006/0153151 A1 | 7/2006 | Huang | |
| 2006/0270411 A1 | 11/2006 | Grayson | |
| 2006/0291417 A1 | 12/2006 | Aust et al. | |
| 2007/0248033 A1 | 10/2007 | Bejerano | |
| 2007/0248059 A1 | 10/2007 | Jain et al. | |
| 2007/0274211 A1 | 11/2007 | Tsubota | |
| 2008/0031212 A1 | 2/2008 | Ogura | |
| 2008/0096575 A1* | 4/2008 | Aragon | H04W 36/22 455/453 |
| 2008/0176571 A1 | 7/2008 | Choi | |
| 2009/0219826 A1 | 9/2009 | Linkola et al. | |
| 2009/0274129 A1 | 11/2009 | Ponnuswamy | |
| 2010/0002614 A1* | 1/2010 | Subrahmanya | H04W 52/244 370/311 |
| 2010/0085884 A1 | 4/2010 | Srinivasan et al. | |
| 2011/0225090 A1* | 9/2011 | Hammad | G06Q 20/40 705/44 |
| 2011/0307609 A1 | 12/2011 | Rangarajan | |
| 2012/0224481 A1 | 9/2012 | Babiarz et al. | |
| 2012/0230305 A1 | 9/2012 | Barbu et al. | |
| 2012/0287783 A1 | 11/2012 | Kuhn et al. | |
| 2013/0223240 A1* | 8/2013 | Hayes | H04W 28/0231 370/252 |
| 2013/0258922 A1 | 10/2013 | Park | |
| 2013/0272164 A1* | 10/2013 | Leonardos | H04W 12/04 370/254 |
| 2014/0011534 A1 | 1/2014 | Dimou | |
| 2014/0051393 A1 | 2/2014 | Mildh et al. | |
| 2014/0112170 A1* | 4/2014 | Zhou | H04W 72/10 370/252 |
| 2014/0162626 A1* | 6/2014 | Cui | H04W 48/12 455/422.1 |
| 2014/0199994 A1 | 7/2014 | Richards | |
| 2014/0204850 A1* | 7/2014 | Kim | H04L 5/0078 370/329 |
| 2015/0043336 A1 | 2/2015 | Zhu | |
| 2015/0043560 A1* | 2/2015 | Guo | H04W 24/10 370/338 |
| 2015/0049707 A1 | 2/2015 | Vajapeyam et al. | |
| 2015/0055470 A1 | 2/2015 | Kahn et al. | |
| 2015/0078153 A1 | 3/2015 | Kuo et al. | |
| 2015/0109940 A1 | 4/2015 | Okhravi et al. | |
| 2015/0139186 A1 | 5/2015 | Kim et al. | |
| 2015/0140967 A1* | 5/2015 | Leu | H04L 63/101 455/411 |
| 2015/0195743 A1 | 7/2015 | Sirotkin et al. | |
| 2015/0215850 A1 | 7/2015 | El Moumouhi et al. | |
| 2015/0319677 A1 | 11/2015 | Colban et al. | |
| 2015/0351079 A1 | 12/2015 | Himayat et al. | |
| 2016/0021605 A1 | 1/2016 | Kim et al. | |
| 2016/0135100 A1 | 5/2016 | Teyeb et al. | |
| 2016/0205592 A1 | 7/2016 | Koskinen et al. | |
| 2016/0286483 A1 | 9/2016 | Bergstrom et al. | |
| 2016/0302136 A1 | 10/2016 | Bergstrom et al. | |
| 2016/0337903 A1 | 11/2016 | Cheng et al. | |

FOREIGN PATENT DOCUMENTS

| | | | |
|---|---|---|---|
| WO | 2007076147 A2 | 7/2007 | |
| WO | 2013176588 A1 | 11/2013 | |
| WO | 2014011094 A1 | 1/2014 | |
| WO | 2014056544 A1 | 4/2014 | |
| WO | 2014071979 A1 | 5/2014 | |
| WO | 2014078371 A1 | 5/2014 | |
| WO | 2014079509 A1 | 5/2014 | |
| WO | 2014084792 A1 | 6/2014 | |
| WO | 2014086434 A1 | 6/2014 | |
| WO | 2014094849 A1 | 6/2014 | |
| WO | WO 2015026334 A1 * | 2/2015 | ............ H04W 28/08 |

* cited by examiner

TRAFFIC STEERING BETWEEN WLAN AND CELLULAR NETWORKS

RELATED APPLICATIONS

This application claims priority under 35 U.S.C. § 119(e) to Provisional Patent Application Ser. No. 61/943,071, filed Feb. 21, 2014, the entire contents of which are incorporated by reference herein.

TECHNICAL FIELD

The present disclosure relates generally to connection management for dual mode User equipments (UEs) and, more particularly, to methods and apparatus for steering UEs between a Wireless Local Area Network (WLAN) and cellular networks.

BACKGROUND

Most UEs currently on the market are dual mode UEs with the ability to connect to both cellular networks and WLANs. For example, a dual mode UE may be capable of connecting to either a 3rd Generation Partnership Project (3GPP) cellular network, such as a Long-Term Evolution (LTE) network, or to a WLAN, such as a WiFi network based on the IEEE 802.11 family of standards.

UEs as described herein may comprise or represent any device used for wireless communications. Examples of user equipment that may be used in certain embodiments of the described wireless and mobile networks are wireless devices such as mobile phones, mobile terminals, terminals, stations (e.g. in the IEEE 802.11 standard a UE may be a station (STA)), smart phones, portable computing devices such as lap tops, handheld devices, tablets, net books, computers, personal digital assistants, machine-to-machine devices such as sensors or meters (e.g. wireless devices in which there is no end user associated with the device), and other wireless communication devices that may connect to wireless and/or mobile networks.

Licensed spectrum used for 3GPP cellular networks is a premium commodity with a higher per bit cost compared to the unlicensed WLAN spectrum. Therefore, network operators are increasingly utilizing WLANs as a data offload strategy for 3GPP cellular networks. Therefore, dual mode UEs offered by most network operators dual exhibit a marked preference for connecting via a WLAN for data services rather than a 3GGP network when a WLAN is available.

Due to the inherent preference for WLANs over 3GPP cellular networks, steering a UE to connect to a WLAN is not difficult. However, most UEs dislike moving from a WLAN to 3GPP cellular network for their data service even when the user experience with the WLAN is poor. In such situations, de-authentication techniques can be used to steer a UE from the WLAN and to a 3GPP cellular network. However, forcing UEs to steer away from the WLAN using traditional de-authentication techniques may result in the UEs "blacklisting" the WLAN's Service Set Identifier (SSID). When the UE is de-authenticated, the WLAN may still be visible to the UE and the UE may attempt to reconnect to the WLAN. If the UE is de-authenticated and subsequent attempts to reconnect are ignored, the UE may "blacklist" the WLAN. The UE may also blacklist if the UE is de-authenticated three times within a five minute time window.

Once a UE "blacklists" a WLAN, the UE will consider the WLAN as unavailable. The UE will exclude the "blacklisted" WLAN when subsequently attempting to connect to a communication network even if the "blacklisted" WLAN is available. The UE will not attempt to connect back to the "blacklisted" WLAN until one of the following events happens:

(1) the user explicitly asks for the UE to connect to the "blacklisted" network;

(2) the UE is placed (or automatically goes) in a sleep mode and is then waken; or (3) a new application is invoked that requires data connection.

The network operator has no control over UE access selection making it difficult to steer the UE back to the WLAN. The operator's inability to control access selection results in sub-optimal utilization of network resources, potential loss of revenue, and poor user experience in congested networks. Thus, for an operator who has deployed both 3GPP cellular networks and WLANs which provide overlapping coverage, it is highly desirable to control which UEs connect to which networks for data services.

SUMMARY

The present disclosure relates to methods and apparatus for steering UEs connected to a WLAN from the WLAN to a cellular network or other network with an overlapping coverage area. To steer a connected UE from a WLAN to a cellular network, the access point (AP) in the WLAN de-authenticates the UE and suppresses the transmission of the SSID to avoid "blacklisting." Probe requests from the UE are ignored. From the perspective of the UE, the suppression of the SSID makes it appear to the UE that it has moved out of range of the AP so the UE will not "blacklist" the WLAN. In some embodiments, the AP in the WLAN can be preconfigured to always suppress transmission of the SSID. UEs may be pre-programmed with or provided settings for connecting to the "hidden" access node. In other embodiments, the transmission of the SSID can be dynamically suppressed to steer UEs away from the WLAN as needed depending on congestion levels or other factors.

Exemplary embodiments of the disclosure comprise methods implemented by an access point (AP) in a WLAN for steering a connected UE from the WLAN to a cellular network with an overlapping coverage area. In one embodiment of the method, the AP suppresses the broadcast of the network identifier (ID) for the WLAN and de-authenticates the UE. After de-authenticating the UE, the AP ignores probe requests from the UE to steer the UE to the cellular network.

In some embodiments of the method, the suppressing comprises suppressing the broadcast of the unique network identifier of the WLAN in the entire WLAN coverage area.

In some embodiments of the method, the suppressing comprises suppressing the broadcast of the unique network identifier of the WLAN in a part of the WLAN coverage area.

In some embodiments of the method, the suppressing comprises dynamically suppressing the broadcast of the unique network identifier during one time period and enabling the broadcast of the unique network identifier during another time period.

In some embodiments of the method, the unique network identifier of the WLAN comprises a Service Set Identifier (SSID) of the WLAN.

In some embodiments of the method, the suppressing comprises setting the length of a Service Set Identifier (SSID) Information Element (IE) to be zero in beacon frames sent by the AP.

In some embodiments of the method, the de-authenticating comprises sending a reason code to the UE indicating the UE is not within the coverage area of the WLAN.

In some embodiments of the method, the WLAN and the cellular network are operated by the same network operator.

Some embodiments of the method the de-authenticating is performed responsive to instructions from a network node in the WLAN.

Other embodiments of the disclosure comprise an AP in a WLAN configured to steer a UE from the WLAN to a cellular network with an overlapping coverage area, wherein the UE is connected to the WLAN through the AP. In one embodiment of the AP, the AP comprises a transceiver circuit and a processing circuit. The transceiver circuit is configured to communicate with the UE. The processing circuit is configured to suppress the broadcast of a unique network ID of the WLAN and de-authenticate the UE from the WLAN. The processing circuit is further configured to ignore probe requests from the UE to steer the UE to connect to the cellular network.

In some embodiments of the AP, the processing circuit is configured to suppress the broadcast of the unique network identifier of the WLAN in the entire WLAN coverage area.

In some embodiments of the AP, the processing circuit is configured to suppress the broadcast of the unique network identifier of the WLAN in a part of the WLAN coverage area.

In some embodiments of the AP, the processing circuit is configured to dynamically suppress the broadcast of the unique network identifier during one time period and enabling the broadcast of the unique network identifier during another time period.

In some embodiments of the AP, the processing circuit is configured to transmit a Service Set Identifier (SSID) of the WLAN as the network identifier.

In some embodiments of the AP, the processing circuit is configured to suppress comprises setting the length of a Service Set Identifier (SSID) Information Element (IE) to be zero in beacon frames sent by the AP.

In some embodiments of the AP, the processing circuit is configured to de-authenticate a UE by sending a reason code to the UE indicating the UE is not within the coverage area of the WLAN.

In some embodiments of the AP, the WLAN and the cellular network are operated by the same network operator.

In some embodiments of the AP, the processing circuit is configured to de-authenticate a UE responsive to instructions from a network node in the WLAN.

The methods and apparatus above not only enable UE traffic steering, but will also make sure that the UE will not "blacklist" the WLAN. This ensures that the UE may undergo network transitions between WLAN and cellular networks without requiring user intervention of any kind.

DETAILED DESCRIPTION

Figure 1:
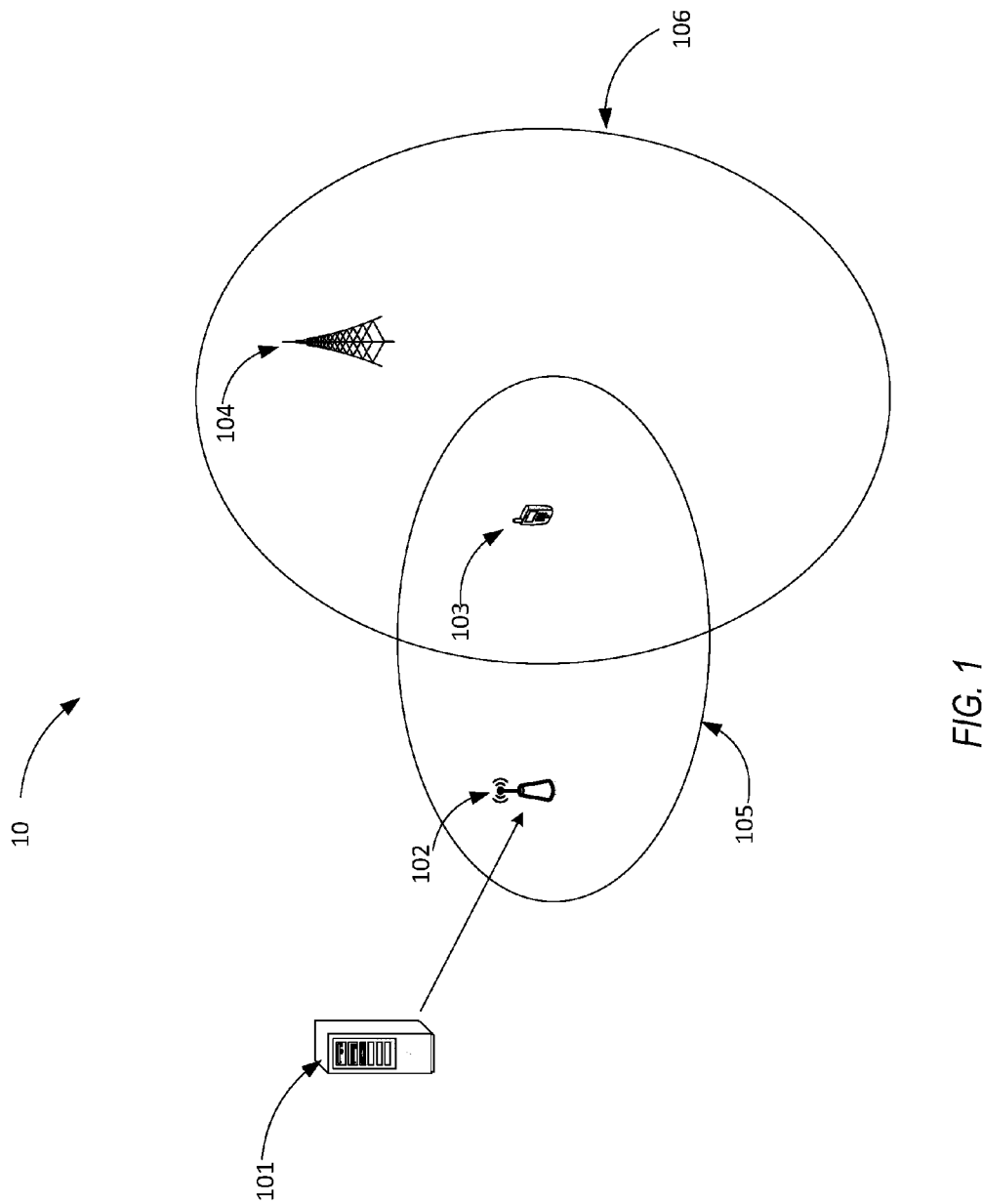
FIG. 1 illustrates a WLAN and a cellular network with an overlapping coverage area.

Referring now to the drawings, FIG. 1 illustrates a communication network 10 comprising a WLAN 105 and a cellular network 106 with overlapping coverage areas. The WLAN 105 may comprise a WiFi network based on the IEEE 802.11 family of standards. The cellular network 106 may comprise a 3GPP cellular network, such as a WCDMA network or LTE network. A dual mode UE 103 is located in the overlapping area of the WLAN 105 and cellular network 106. The UE 103 may connect to the cellular network 106 through a base station 104 or to the WLAN 105 through an AP 102. In some embodiments, a WLAN controller 101 in the WLAN configures and manages the AP 102. While FIG. 1 illustrates only one UE, it will be appreciated many dual mode UEs 103 may be operating in the overlapping coverage area.

The WLAN 105 and a cellular network 106 may be operated by the same network operator or by different network operators. When the WLAN 105 and a cellular network 106 are jointly operated, it is to the operator's advantage to manage the UEs' connections in order to meet a number of operating goals, such as improved user experience, higher per-UE throughput, load balancing between networks, or other goals set by the operator to optimize network performance in some manner. Due to the inherent preference for a WLAN connection over the cellular network connection, the dual mode UE 103 located in the overlapping area of a WLAN 105 and a cellular network 106 will normally choose to connect to the WLAN 105 even if the connection is poor. The techniques described herein may be used to steer a UE 103 connected to an AP in the WLAN 105 to the cellular network 106.

Figure 2:
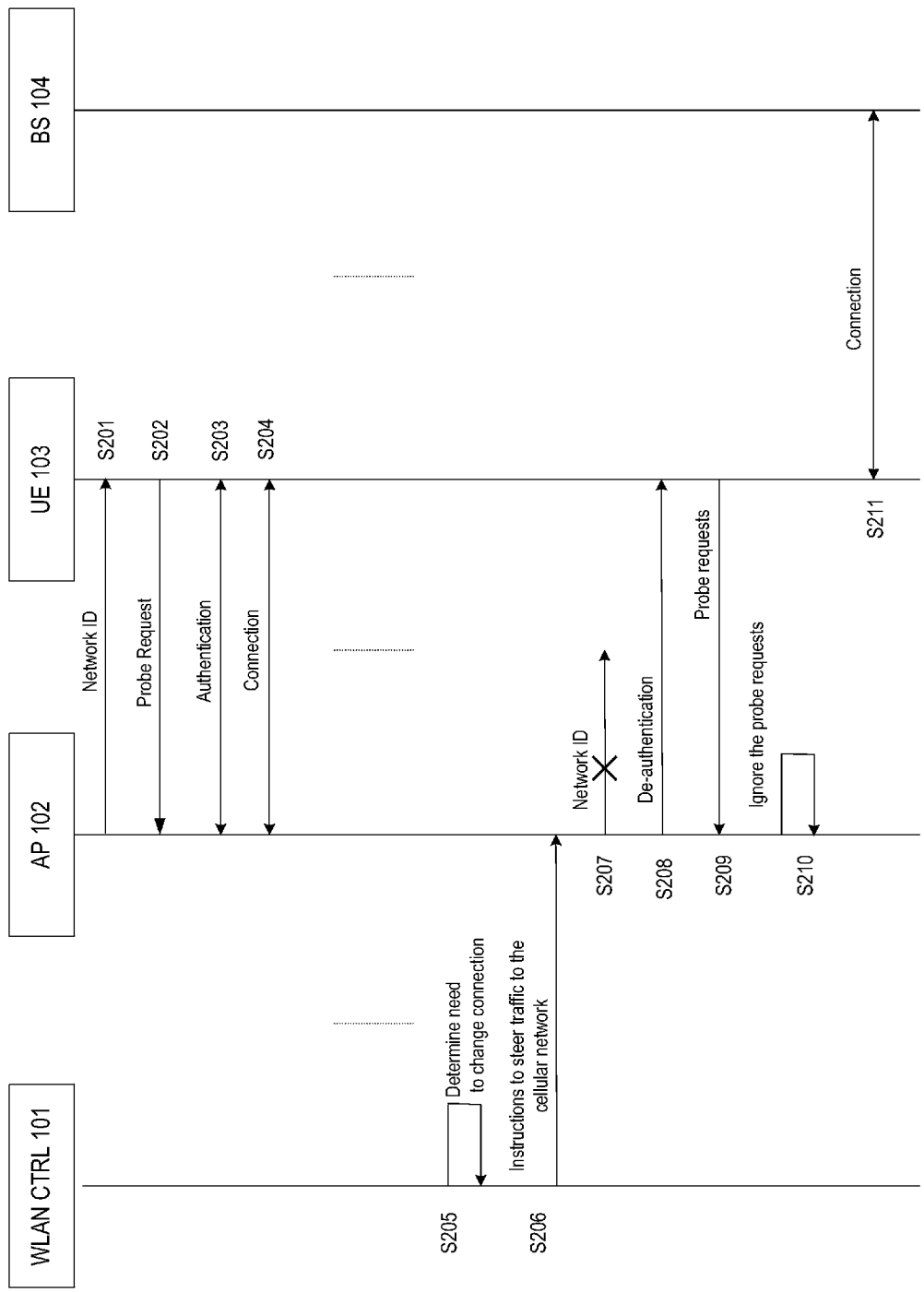
FIG. 2 illustrates a procedure for steering a UE from a WLAN to a cellular network.

FIG. 2 illustrates an exemplary procedure for steering a UE 103 from a WLAN 105 to a cellular network 106 according to one embodiment. The UE 103 initially connects to the WLAN 105 (S201-S204). To establish the connection, the AP 102 in WLAN 105 broadcasts the SSID of the WLAN 105 or other network ID in a beacon frame, or transmits the network ID responsive to a probe request from the UE 103 (S201). When the UE 103 obtains the network ID of the WLAN 105, the UE 103 sends a probe request to the AP step (S202). An authentication procedure is performed between the WLAN 105 and the UE 103 (step S203). After successful authentication, a connection between the UE 103 and AP 102 is established (S204).

After the connection to the WLAN 105 is established, the WLAN controller 101 may determine a need to change the connection of one or more UEs 103 from the WLAN 105 to a cellular network 106 (S205). The determination may be based on several factors such as network congestion, signal quality, user experience, or other factors. The WLAN controller 101 may send instructions to the AP 102 to offload or steer traffic to another network (step S206). In some embodiments, the instruction may designate a particular UE 103 or particular group of UEs 103 to be steered to the cellular network 106. In other embodiments, the WLAN controller may not specify which UEs to steer and the AP 102 determines which UEs 103 to steer. In other embodiments, the AP 102 itself may determine the need to steer traffic to the cellular network 106.

When the AP 102 receives an instruction to steer traffic to another network, the AP 102 dynamically suppresses transmission of the SSID or other network ID for the WLAN 105 (S207). The SSID may be suppressed, for example, by setting the length of the SSID Information Element (IE) in the beacon frames to zero. After suppressing the transmission of the network ID, the AP 102 de-authenticates the UE 103 (S208). In one embodiment, the AP 102 may de-authenticate the UE 103 by sending a de-authentication message with a reason code indicating the UE 103 is not within the coverage area of the WLAN 105. For example, in an 802.11 WiFi network, the AP 102 may set the value of the ReasonCode IE in the de-authentication message equal to 3 indicating that the UE 103 is leaving or has left the area where the AP 102 provides coverage. The de-authentication message with the ReasonCode IE set to 3 causes the UE 103 to flush the cache for the beacon frames. The de-authentication message may be addressed to a particular UE 103 or group of UEs 103. The UEs 103 not targeted for steering will not be de-authenticated.

The suppression of the SSID by the AP 102 makes it appear to the UE 103 that it has moved out of the coverage area of the AP 102. The UE 103 may still send probe requests to the AP 102 to obtain the network ID of the WLAN (S209). The AP 102 may ignore the probe requests sent by the UE 103 (S210). If no response to the probe requests is received, the UE 103 will conclude that the WLAN 105 is no longer available and establish a connection with the cellular network 105 (S211).

The suppression of the SSID will have no impact on UEs 103 that remain connected to the WLAN 105, but may prevent other UEs 103 from connecting to the WLAN 105 as long as the SSID is suppressed. The network operator can still enable connection by other UE 103 to the "hidden" WLAN 105 by pre-programming UEs 103 with settings for connecting to the WLAN 105, or by transmitting a message to the UEs 103 including the proper settings for connecting to the WLAN 105.

In some embodiments, the AP 102 may suppress the broadcast of the SSID in the entire WLAN coverage area. Alternatively, the AP may suppress the broadcast of the SSID in a part of WLAN coverage area, e.g., the overlapping area or the area surrounding the de-authenticated UE 103. In some embodiments, the AP 102 may suppress the broadcast of the network ID of the WLAN 105 in a part of the overlapping area, e.g., the vicinity area of the UE 103.

Figure 3:
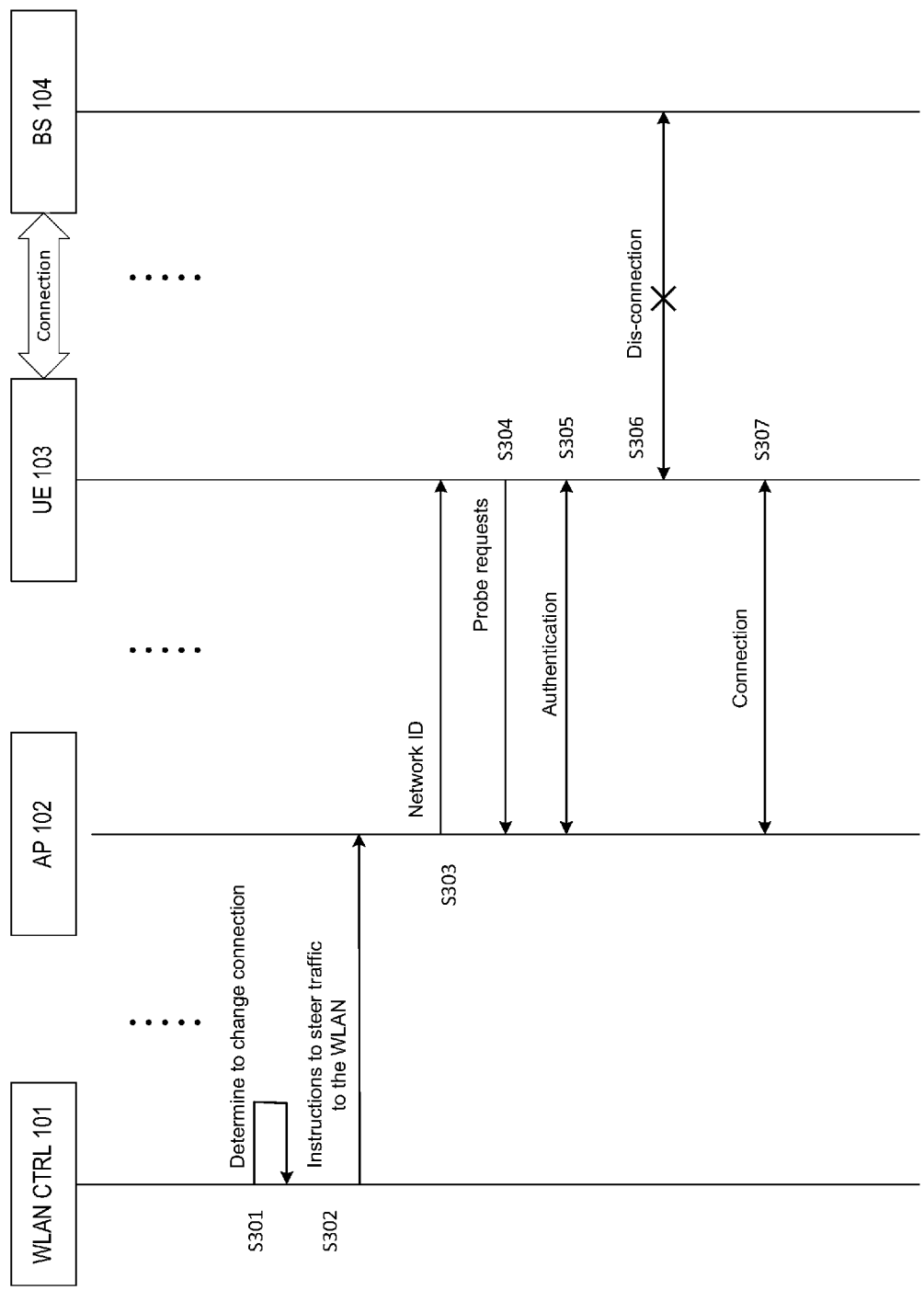
FIG. 3 illustrates a procedure of steering the UE back to the WLAN.

After steering the UE 103 to the cellular network, the WLAN controller 101 may decide to allow the UE 103 to reconnect to the WLAN 105, e.g., when the WLAN 105 has low load. The procedure for reconnecting to the WLAN 105 is illustrated in FIG. 3. The WLAN controller 101 determines that reconnection to the WLAN 105 is allowed (S301). The WLAN controller 101 may send an instruction to allow connection to the WLAN 105 to the AP 102 (S302). The AP 102 changes the SSID setting from suppressed to broadcast and begins broadcast of the unique network ID (S303). After obtaining the SSID of the WLAN 105, the UE 103 may send a probe request to the WLAN 105 (S304). The AP 102 and UE 103 perform an authenticating procedure (S305). After successful authentication, the UE may disconnect from the cellular network 106 (S306) and connect to the available again WLAN (S307). Thus, the traffic is steered back to the WLAN 105 and all data traffic of the UE will now be served by the WLAN 105. Later, if it is desired to steer traffic from the WLAN 105 to the cellular network 106, the AP 102 may dynamically suppress the broadcast of the unique network ID and de-authenticate one or more UEs 103.

In the embodiment shown in FIGS. 2 and 3, the AP 102 dynamically suppresses the broadcast of the unique network ID during some time periods and enables the broadcast of the unique network ID during other time periods as needed to achieve operational goals of the network operator. In such situations, the network ID is may be suppressed for a predetermined time period or until conditions change. In other embodiments of the invention, the AP 102 may be configured to always suppress transmission of the SSID of the WLAN 105. UEs 103 may be pre-programmed with or provided settings for connecting to the "hidden" AP 102.

Figure 4:
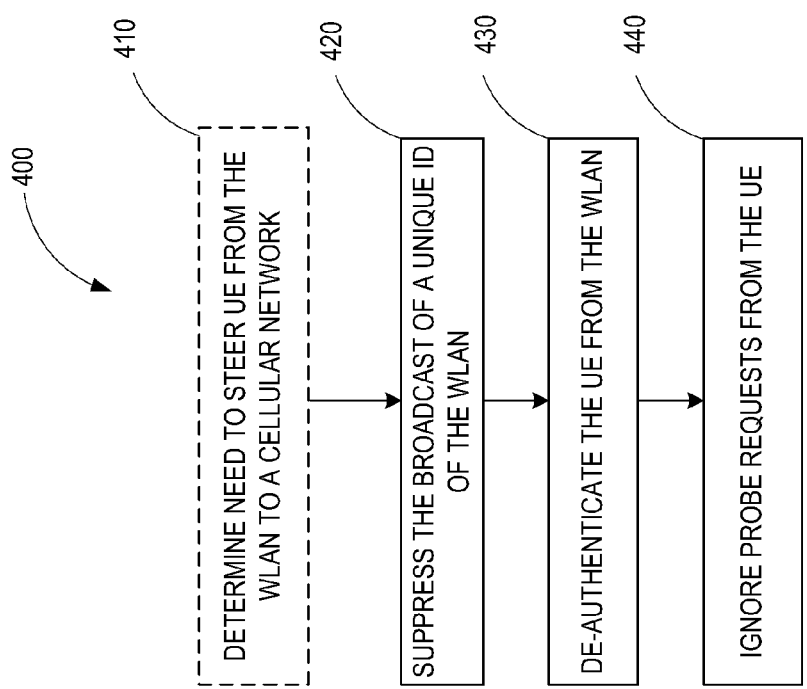
FIG. 4 illustrates an exemplary method for steering a UE between the WLAN to a cellular network.

FIG. 4 illustrates an exemplary method 400 implemented by an AP 102 in the WLAN 105 for steering a connected UE 103 from the WLAN 105 to a cellular network 106 or other alternative network. The AP 102 determines a need to steer a UE 103 from the WLAN 105 to the cellular network 106 (block 410). In some embodiments, the AP 102 may receive an instruction from a WLAN controller 101 or other network node to steer a specific UE, a group of UEs or unspecified UEs from the WLAN 105 to a cellular network 106 (step S410). In other embodiments, the AP 102 may autonomously determine that steering is needed. The AP 102 suppresses the broadcast of the network ID, e.g., the SSID, of the WLAN 105 (step 420). As previously noted, the AP 102 may suppress the transmission of the network ID (e.g., SSID) dynamically or, alternatively, the AP 102 may be configured to always suppress broadcast a network ID. After determining a need to steer a UE 103 from the WLAN 105 to the cellular network 106, the AP 102 de-authenticates the UE 103, for example, by sending a de-authentication message to the UE 103 (step 430). The de-authentication message may include a reason code indicating that the UE 103 is moving out of the coverage area of the AP 102. After de-authenticating the UE 103, the AP 102 ignores probe requests sent by the UE (step 440).

Figure 5:
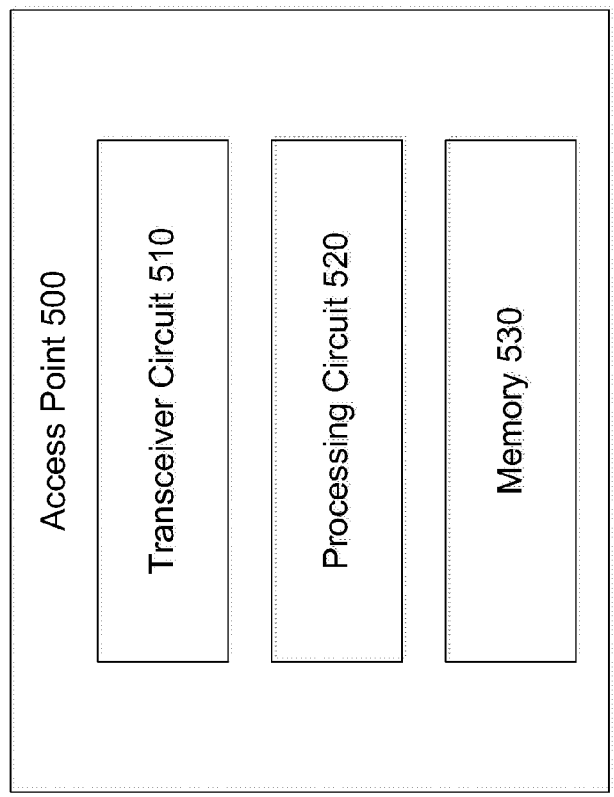
FIG. 5 illustrates an exemplary access point configured to steer UEs a UE between the WLAN to a cellular network

FIG. 5 illustrates an exemplary access point (AP) 500 for implementing the method described herein. The AP 500 may be the AP 102 as shown in FIGS. 1-3. The AP 500 comprises a transceiver circuit 510, a processing circuit 520, and memory 530. The transceiver circuit 510 is configured to communicate with the one or more UEs 103 over an air interface of the WLAN 105. The processing circuit 520 processes signals transmitted and received by the AP 500, and provides operational control and configuration for the AP 500. The processing circuit 520 may comprise one or more processors, hardware, firmware, or a combination thereof. The processing circuit 520 is configured to implement the method as shown in FIG. 4. The memory 530 may comprise both Random Access Memory (RAM) and Read-Only Memory (ROM), or other non-transitory computer readable medium. Computer program instructions and data required for operation and configuration of the AP 500 may be stored in non-volatile memory, such as Erasable Programmable Read Only Memory (EPROM), Electrically Erasable Programmable Read Only Memory (EEPROM), and/or flash memory. Memory 530 may be implemented as discrete devices, stacked devices, or integrated with one or more processors.

Figure 6:
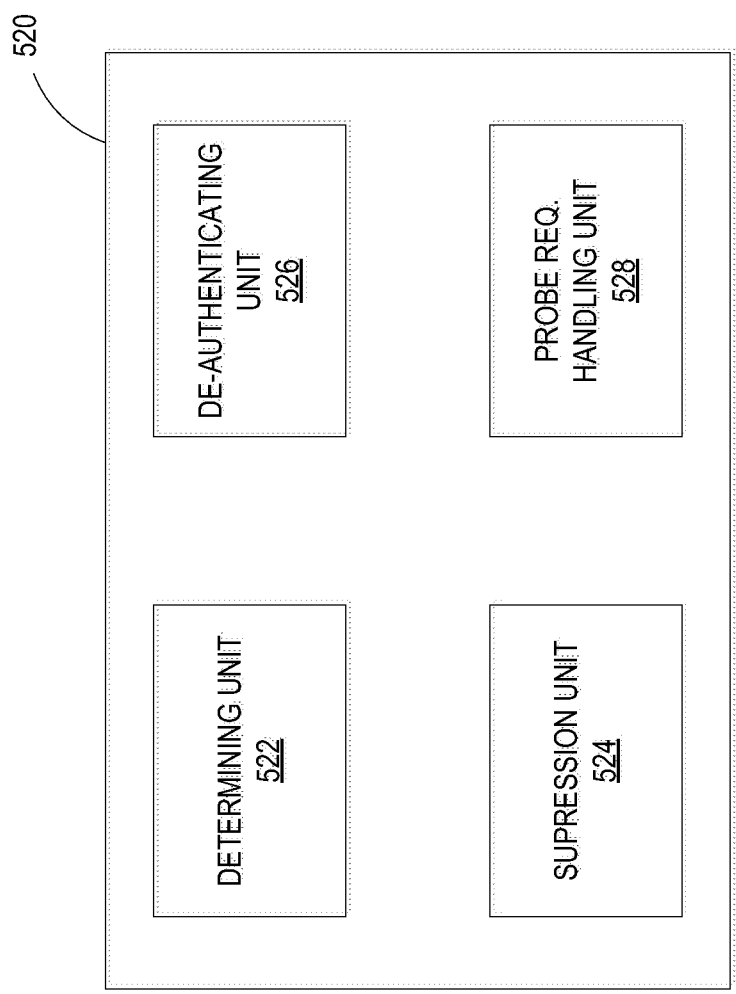
FIG. 6 illustrates the main functional components of a processing circuit in an AP configured for steering UEs between a WLAN and cellular network.

FIG. 6 illustrates the main functional components of the processing circuit 520 in more detail. The processing circuit comprises a determining unit 522, suppressing unit 524, de-authentication unit 526, and probe request handling unit 528. These units 522, 524, 525 and 528 may be implemented by one or more processors, hardware, firmware or a combination thereof. Functions represented by different units 522, 524, 525 and 528 may be implemented combined in a single processor or performed by different processors.

The determining unit 522 determines the need to steer one or more UEs 103 from the WLAN 105 to the cellular network 106. The decision to steer one or more UEs 103 to the cellular network 106 may be based on a message received from a WLAN controller 101. Alternatively, the determining unit 522 may autonomously decide the need to steer the UEs 103 to the cellular network 106.

The suppressing unit 524 suppresses transmission of the network identifier by the AP 102. The network ID for the WLAN 105 can be suppressed, for example, by setting the length of the SSID information element in the beacon frames to 0. Other techniques could also be used. In one embodiment, the suppressing unit 524 dynamically suppresses transmission of the network ID based on the decisions of the determining unit 522. In other embodiments, the suppressing unit 524 may be configured to always suppress transmission of the SSID. The network operator can configure UEs 103 to connect to the "hidden" AP 102 by providing the UEs 103 with information necessary to connect to the AP 102.

The de-authentication unit 526 is responsive to control signals from the determining unit 522 to de-authenticate one or more UEs 103. In one embodiment, the identity of the UEs 103 to be de-authenticated is provided by the determining unit 522. In other embodiments, the de-authentication unit 526 may determine which UEs 103 to de-authenticate.

The probe response handling unit 528 is responsible for responding to probe requests from the UEs 103. The probe response handling unit 528 receives a list of UEs 103 that have been de-authenticated from either the determining circuit 522 or de-authenticating unit 526. The probe response handling unit 528 is configured to ignore probe requests from the de-authenticated UEs 103.

Figure 7:
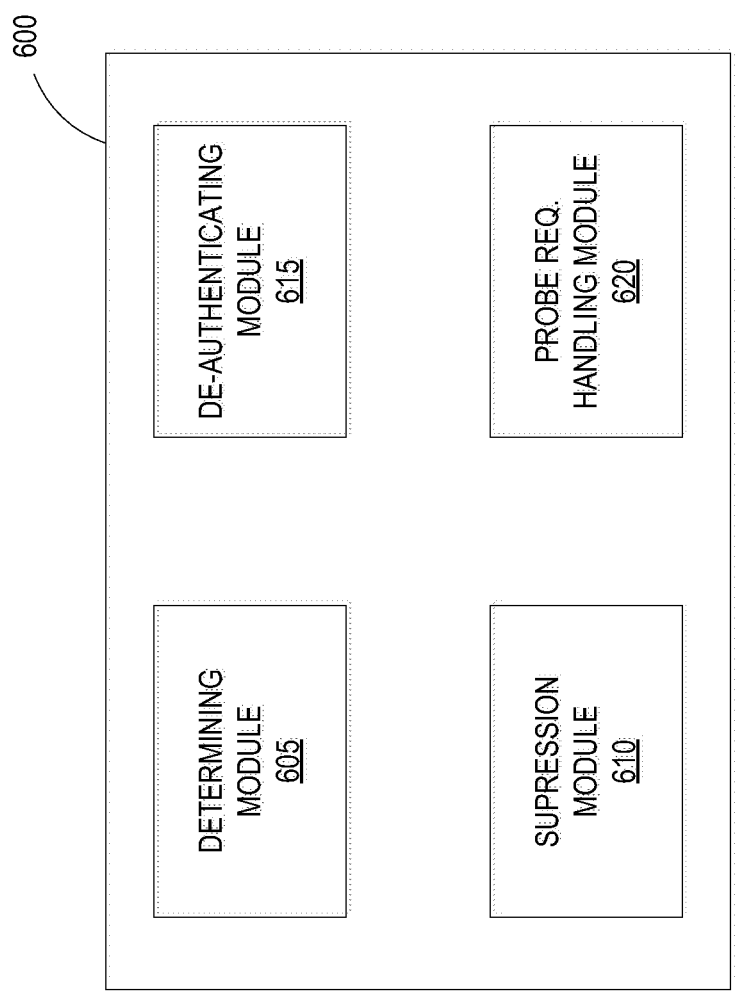
FIG. 7 illustrates a computer program product for steering UEs between a WLAN and cellular network.

FIG. 7 illustrates a computer program product 600 for steering UEs between a WLAN and cellular network. The computer program product 600 comprises a plurality of modules containing program code and data for performing the method shown in FIG. 4. The computer program product 600 may be stored in a non-transitory computer readable medium, e.g. memory 530. In one embodiment, the computer program product 600 comprises a determining module 605, suppressing module 610, de-authentication unit 620, and probe request handling unit 625. The determining module 605 comprises code for determining the need to steer one or more UEs 103 from the WLAN 105 to the cellular network 106. The suppressing module 524 comprises code for suppressing transmission of the network identifier by the AP 102. The de-authentication module 615 comprises code for de-authenticating one or more UEs 103. The de-authentication module 615 is responsive to commands or instructions from the determining module 605 to de-authenticate one or more UEs 103. The probe response handling module 620 comprises code for responding to probe requests from the UEs 103. The probe response handling module 620 receives a list of UEs 103 that have been de-authenticated from either the determining module 605 or de-authenticating module 615. The probe response handling module 620 is configured to ignore probe requests from the de-authenticated UEs 103.

The disclosure herein discloses methods and apparatus for offloading or steering traffic to a cellular network 106 having a coverage areas 106 that overlaps the WLAN 105. The methods and apparatus provide the network operator greater control over the UEs connections. Thus, the network operator may choose which radio technology will serve the UE 103 in order to optimize any number of overall network objectives, such as, but not limited to, per-UE throughput, user experience, or network load balancing.

The techniques described herein do not require any modification to behavior and thus does not require changes to UE 103. Also, because the AP 102 does not actively reject the UE 103 from the WLAN 105, the UE will not "blacklist" the WLAN 105. Therefore, the method avoids "blacklisting" of the WLAN by the UE such that the network can control or encourage UE transitions between WLAN and cellular networks without user intervention.

The present disclosure may, of course, be carried out in other ways than those specifically set forth herein without departing from essential characteristics of the disclosure. The present embodiments are to be considered in all respects as illustrative and not restrictive, and all changes coming within the meaning and equivalency range of the appended claims are intended to be embraced therein.

What is claimed is:

1. A method implemented by an access point in a Wireless Local Area Network (WLAN) for steering traffic of a user equipment (UE) from the WLAN to a cellular network with an overlapping coverage area, wherein the UE is connected to the WLAN through the AP, said method comprising:
   suppressing the broadcast of a unique network identifier of the WLAN;
   de-authenticating the UE from the WLAN;
   obtaining a list of de-authenticated UEs that have been de-authenticated from the WLAN, the list including the UE; and
   selectively ignoring probe requests from the de-authenticated UEs in the list, while responding to probe requests from one or more other UEs not included in the list, to steer the UE to connect to the cellular network but allow the one or more other UEs to connect to the WLAN.

2. The method of claim 1, wherein said suppressing comprises suppressing the broadcast of the unique network identifier of the WLAN in the entire WLAN coverage area.

3. The method of claim 1, wherein said suppressing comprises suppressing the broadcast of the unique network identifier of the WLAN in a part of the WLAN coverage area.

4. The method of claim 3, wherein the part of the WLAN coverage area comprises the overlapping coverage area.

5. The method of claim 1, wherein said suppressing comprises dynamically suppressing the broadcast of the unique network identifier during one time period and enabling the broadcast of the unique network identifier during another time period.

6. The method of claim 1, wherein said unique network identifier of the WLAN comprises a Service Set Identifier (SSID) of the WLAN.

7. The method of claim 6, wherein said suppressing comprises setting the length of a Service Set Identifier (SSID) Information Element (IE) to be zero in beacon frames sent by the AP.

8. The method of claim 1, wherein said de-authenticating comprises sending a de-authentication message with a reason code to the UE indicating the UE is not within the coverage area of the WLAN.

9. The method of claim 1, wherein the WLAN and the cellular network are operated by the same network operator.

10. The method of claim 1, wherein said de-authenticating is performed responsive to instructions from a network node in the WLAN.

11. An access point in a Wireless Local Area Network (WLAN) configured to steer traffic of a user equipment (UE) from the WLAN to a cellular network with an overlapping coverage area, wherein the UE is connected to the WLAN through the AP, said AP comprising:
   a transceiver circuit configured to communicate with the UE;
   a processing circuit configured to:
      suppress the broadcast of a unique network identifier of the WLAN;
      de-authenticate the UE from the WLAN;
      obtain a list of de-authenticated UEs that have been de-authenticated from the WLAN, the list including the UE; and
      selectively ignore probe requests from the de-authenticated UEs in the list, while responding to probe requests from one or more other UEs not included in the list, to steer the to connect to the cellular network but allow the one or more other UEs to connect to the WLAN.

12. The access point of claim 11, wherein said processing circuit is further configured to suppress the broadcast of the unique network identifier of the WLAN in the entire WLAN coverage area.

13. The access point of claim 11, wherein said processing circuit is further configured to suppress the broadcast of the unique network identifier of the WLAN in a part of the WLAN coverage area.

14. The access point of claim 11, wherein said processing circuit is further configured to dynamically suppress the broadcast of the unique network identifier during one time period and enable the broadcast of the unique network identifier during another time period.

15. The access point of claim 11, wherein said unique network identifier of the WLAN comprises a Service Set Identifier (SSID) of the WLAN.

16. The access point of claim 15, wherein said processing circuit is further configured to set the length of a Service Set Identifier (SSID) Information Element (IE) to be zero in beacon frames sent by the access point.

17. The access point of claim 11, wherein said transceiver circuit is further configured to de-authenticate the UE by sending a de-authentication message with a reason code to the UE indicating the UE is not within the coverage area of the WLAN.

18. The access point of claim 11, wherein the WLAN and the cellular network are operated by the same network operator.

19. The access point of claim 11, wherein said transceiver circuit is further configured to de-authenticate the UE responsive to instructions from a network node in the WLAN.

20. The access point of claim 11, wherein the part of the WLAN coverage area comprises the overlapping coverage area.

* * * * *